United States Patent [19]

Ruben et al.

[11] Patent Number: 6,138,237
[45] Date of Patent: Oct. 24, 2000

[54] APPARATUSES, METHODS, AND MEDIA FOR AUTHORING, DISTRIBUTING, AND USING SOFTWARE RESOURCES WITH PURPOSELY RESTRICTED USE

[75] Inventors: Gary D. Ruben, Brighton; Mark H. Goldwater, Lexington, both of Mass.

[73] Assignee: Bistream Inc., Cambridge, Mass.

[21] Appl. No.: 08/923,264

[22] Filed: Sep. 4, 1997

[51] Int. Cl.[7] .............................. G06F 11/00; H04L 9/00
[52] U.S. Cl. ............................................ 713/200; 380/23
[58] Field of Search ..................................... 713/200, 201, 713/202; 380/3, 4, 23, 25; 707/512–517, 529, 530, 9; 382/232, 115, 119; 711/100, 164; 340/825.34, 825.31

[56] References Cited

U.S. PATENT DOCUMENTS

| | | | |
|---|---|---|---|
| 4,405,829 | 9/1983 | Rivest et al. .......................... | 178/22.1 |
| 4,446,519 | 5/1984 | Thomas ................................. | 364/300 |
| 4,458,315 | 7/1984 | Uchenick .............................. | 364/200 |
| 4,658,093 | 4/1987 | Hellman ................................ | 380/25 |
| 5,473,691 | 12/1995 | Menezes et al. ...................... | 380/25 |
| 5,502,575 | 3/1996 | Kai et al. ............................. | 358/405 |
| 5,544,255 | 8/1996 | Smithies et al. ...................... | 382/119 |
| 5,761,686 | 6/1998 | Bloomberg ........................... | 707/529 |
| 5,765,176 | 6/1998 | Bloomberg ........................... | 707/514 |
| 5,818,955 | 10/1998 | Smithies et al. ...................... | 382/115 |
| 5,854,693 | 12/1998 | Yoshiura et al. ..................... | 358/468 |
| 5,881,287 | 3/1999 | Mast ..................................... | 395/701 |
| 5,907,619 | 5/1999 | Davis .................................... | 380/23 |

OTHER PUBLICATIONS

Diffie & Hillman, "New Directions in Cryptography", IEEE Transactions on Information Theory, vol. IT–22, No. 6, Nov. 1976, pp. 644–654.

Rivest et al., "A Method For Obtaininfg Digital Signatures and Public–Key Cryptosystems" Communications of the ACM, vol. 21, No. 2, pp. 120–126 (Feb. 1978).

W3C Digital Signature Working Group, "DSig 1.0 Signature Labels", http://www.w3.org/pub/WWW/TR/WD–DSIG–label–970605.html, printed off the World-WideWeb from the above URL on Aug. 14, 1997, 18 pages as printed on the enclosed copy.

*Primary Examiner*—Nadeem Iqbal
*Attorney, Agent, or Firm*—Edward W. Porter

[57] ABSTRACT

Computerized systems for authoring, distributing, and using software resources use authorization codes to restrict the use of such resources. For example, the distributed resources might include one or more documents and one or more page imaging resources, where a given document contains references to one or more page imaging resources, such as fonts, which can be used in rendering an image of such a document, and where the authorization code determines if the page imaging resource referenced by a given document is authorized for use with it. In such a scheme, an authoring system allows a user to pick which page imaging resources are authorized to be used with what documents and the system creates authorization codes which reflect the selected authorization. The resources can be distributed in different ways, such as over a computer network or on computer readable media. The authorization code can indicate the address, such as on a network or recording medium, of the documents with which a given page imaging resource is authorized for use, and can be included in its associated page imaging resource's file. The player system used in such a scheme checks if the address from which it obtains a given document matches one of the addresses in a page imaging resource's authorization code before allowing the page imaging resource to be used in rendering the given document.

39 Claims, 11 Drawing Sheets

```
                                                                    ← 122A
        <HTML>
141     <HEAD><TITLE>TrueDoc's Benefits</TITLE></HEAD>
        <CERT SRC="../global.crt">
        <PFR  SRC="../global.pfr">
        <PFR  SRC="directry.pfr">
        <PFR  SRC="benefits.pfr">
140     <STYLE TYPE="H1" FNAME="Helvetica 24">
        <STYLE TYPE="H2" FNAME="Helvetica 20">
        <STYLE TYPE="P" FNAME="Arial 12" INDENT=".5">
        <STYLE TYPE="LI" FNAME="Arial 12" INDENT=".75" BULLETT="Symbol
142     168">x
        <BODY>
        <NONCHAR FNAME="Bitstream WWW Shape" CHARCODE="001"><!-
144     Bitstream Logo->
        <NONCHAR FNAME="Bitstream WWW Shape" CHARCODE="002"><!-
        TrueDoc Logo->                                              150
        <H1>< LFONT FNAME="Times New Roman Bold 24">TrueDoc's</ LFONT>
        Benefits</H1>                                               150
        <H2>The Central Benefit: < LFONT FNAME="Times New Roman Bold
        20">Truely Portable Electronic Documents</ LFONT></H1>
        <P>TrueDoc enables fonted electronic documents to be truely portable. It lets
        the characters of such a document have the exact same shape, relative size,
        and spacing on virtually any computer, regardless of differences in operating
        systems, font languages, installed fonts, or the applications being run. TrueDoc
        lets fonted text be distributed by diskette, CD ROM, LAN, WAN, Web or net and
        be seen exactly as intended by all their recipients, regardless of how
        < LFONT FNAME="Arial 20">n</ LFONT>
        < LFONT FNAME="Bellevue 20">u</ LFONT>
150A    < LFONT FNAME="Book Antiqua 20">m</ LFONT>
        < LFONT FNAME="Lucida Blackletter">e</ LFONT>
        < LFONT FNAME="Lucida Fax">r</ LFONT>
        < LFONT FNAME="Script 20">o</ LFONT>
        < LFONT FNAME="Poplar 20">u</ LFONT>
        < LFONT FNAME="Tekton 20">s</ LFONT>
        or how < LFONT FNAME="Stencil 16"> unusual</ LFONT> the document's
        original fonts. All that is required for this magic to take place is that the   131A
132     document be recorded by software having access to a TrueDoc <A
        HREF="recorder.html"> recorder</A> and that the viewing computer have a
150     corresponding TrueDoc<A HREF="player.html"> player</A>.</P>
        <H2><LFONT FNAME="Times New Roman Bold 20">TrueDoc's</ LFONT>
        major Benefits</H>
        <UL>                    131
        <LI><A HREF="platform-ind.html">Platform Independence</A>
        <LI><A HREF="font-ind.html">Independent From Installed Fonts</A>
        <LI><A HREF="app-ind.html">Application Independence</A>
        <LI><A HREF="res-ind.html>Resolution Independence</A>
        ...
```

FIG. 2

-server~128
   -...
   -loop until receive message to exit~129
      -if receive HTTP message containing a URL from a client, send the file indicated in the URL to the client's network address contained in the HTTP message~130
   -...

FIG. 3

-MakePfrsForFiles~155
   -for each document for which a PFR is being created~170
      -for each character in current document~172
         -if a physical font record has not been created for its physical font, create one~174
         -if a logical font record has not been created for its logical font, create one~176
         -if a character record has not been recorded in the physical font record for the character, record it~178
   -create an empty PFR and record in it all of the logical and physical font records and character records created in the above loop~194
   -until user has confirmed a proper publishing domain, display Publishing Domain dialog box with current publishing domain, if any~196
      -if user seeks to leave Publishing Domain dialog box without a proper publishing domain, display an error box which indicates the error~216
   -for each URL listed in the fully-authorized directories listbox in Publishing Domain dialog box~218
      -if a corresponding certificate does not already exist, create such a certificate in directory indicated by corresponding URL in listbox~220
      -calculate authorization key identical to certificate's and store in next position in PFR's authorization key table~222
   -for each URL listed in the individually-authorized directories listbox in Publishing Domain dialog box~244
      -hash the text of the, and store the resulting authorization key at the next location in the authorization key table~246
   -calculate and store an error correction code for authorization key table~248
   -hash and store the resulting bytes in the change authorization password portion of the PFR~252
   -encrypt the authoriziation key table~256
   -...

FIG. 5

-PFR data structure~124
    -logical font directory~190
    -logical font record~188
    -...
    -physical font record~180
        -character record~182
        -...
    -...
    -simple glyph program string~184
    -...
    -compound glyph program string~186
    -...
    -encrypted authorization key table~240
        -key~242
        -key~242
        -...
    -error correction code of authorization key table~250
    -change authorization password~254

FIG. 6

-certificate data structure~123
    -certificate identifying byte string~224
    -version and rev of the certificate~226
    -encrypted bytes~228
        -length of the text string of the certificate's URL~230
        -text of the certificate's URL~232
        -authorization key for the certificate~234
    -error correction code for encrypted bytes~236
    -multiple encryption keys for encrypted bytes~238

FIG. 7

-Browser.exe~127
   -...
      -loop~258
         -...
            -get message from message queue~260
               -...
                  -if message identifies URL of a new page~261
                     -call requestURL for it~262
                     -save page's URL in docURL~268
               -...
                  -if message indicates receipt of requested page~270
                     -make initial display of page~272
                     -for each URL of active type in page~274
                        -if the URL is in a PFR tag field and it is not in PFR cache, call requestURL for it~276
                        -if the URL is in a CERT tag field and it is not in certificate cache, call requestURL for it~277
                        -...
                     -if all of page's PFRs and certificates are already cached, call renderPageWithPFRs~278
               -...
                  -if message indicates receipt of a requested PFR~282
                     -decrypt authorization key table and place it in PFR cache and install its physical and logical fonts in dynamic font lists~284
                     -if all of page's PFRs and certificates are cached, call renderPageWithPFRs~286
               -...
                  -if message indicates receipt of a requested certificate~291
                     -create entry for certificate in certificate cache~307
                     -save URL certificate came from in certifURL~308
                     -if an error correction code calculated for certificate does not match one recorded in certificate, mark certificate as invalid~310
                     -else~312
                        -decrypt encrypted portion of certificate~314
                        -if URL in certificate matches CertifURL, mark certificate as valid~316
                        -else mark certificate as invalid~318
                     -if all of page's PFRs and certificates are cached, call renderPageWithPFRs~319
               -...
         -...

FIG. 9

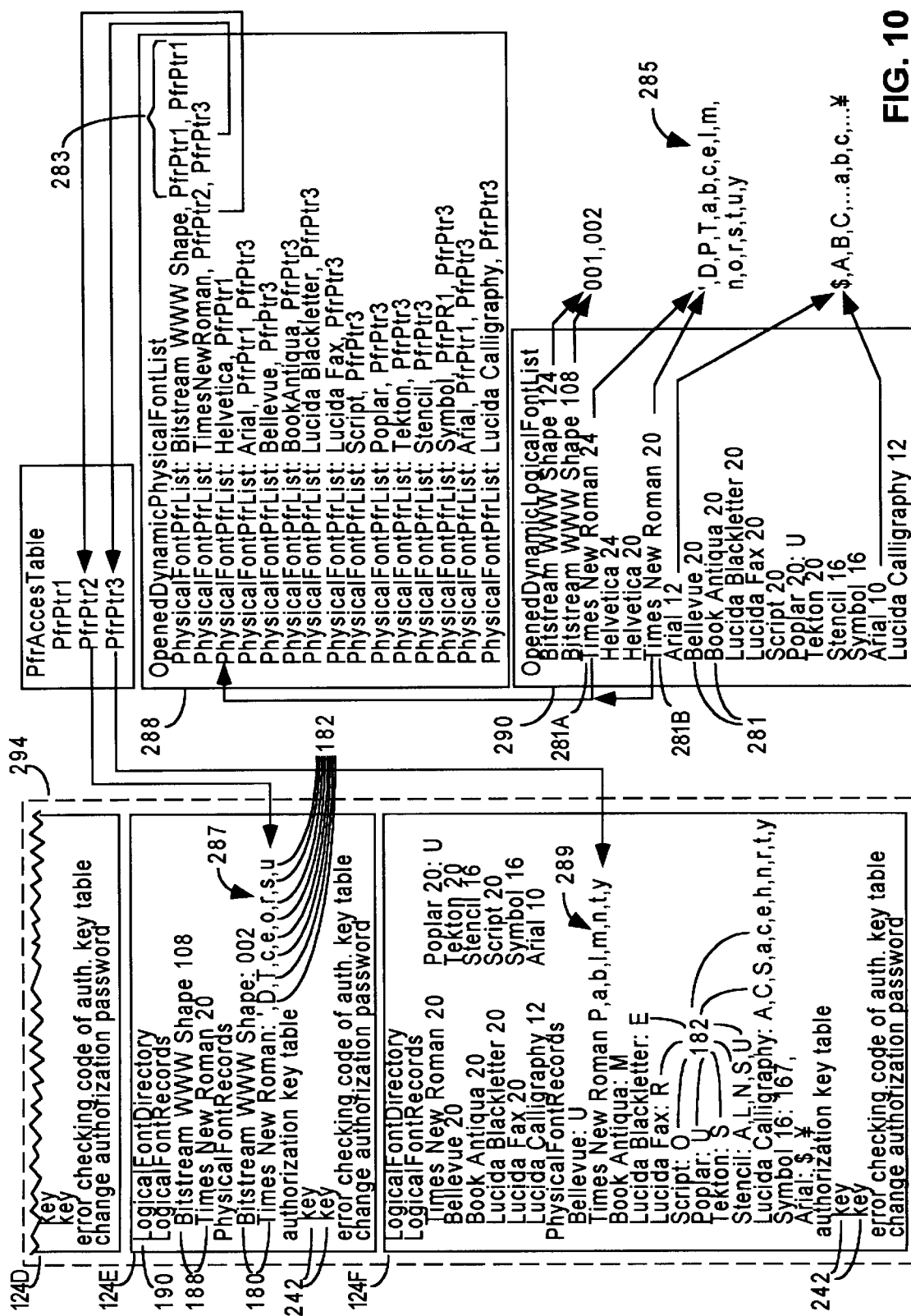

requestURL~263
  -if URL identifies file on another machine, send HTTP request for file over the network~264
  -else if URL identifies file on browser's machine, request file from machine's OS~266
  -...

FIG. 11

-renderPageWithPFRs~280
  -...
  -for each string of text to be rendered in a common font~292
    -if font is installed in OS's font manager, call OS to render string~294
    -else, call CspDoString to render string with PFR font~296
    -if call to CspDoString returns with message that can't render string~298
      -pop error box stating page sought to render one or more characters in an unavailable or unauthorized font~300
      -then render string with a default font in OS's font manager~302
  -...

FIG. 12

-CspDoString~301
  -for each char in string~320
    -zero value of charsPFR associated with the char~322
    -for each PFR in Opened Physical Dynamic Font List containing current physical font which is referenced in the document until charsPFR has a non-zero value~324
      -if PFR's authorization key table is empty or if it does not contain the current character~326
        -start loop for next PFR, if any~328
      -else if~330
        -docURL matches all or an initial part of any CertifURL associated with the document and the matching certificate is marked as valid and the matching certificate's authorization key matches an authorization key in PFR~332
        -or value hashed from docURL, minus protocol portion and file's name, matches an authorization key in PFR~334
        -or PFR contains a redistribution authorization key~338
        -then set charsPFR to PFR of current loop~340
    -if charsPFR is empty, return with msg that can't render string~344
  -for each char in string~346
    -render its shape using the PFR indicated in its charsPFR~348
  -return~350

FIG. 13

-encrypted PFR data structure~124"
    -isPFREncrypted flag~400
    -main body of PFR encrypted by bodyEncryptionKey~380
        -logical font directory~190"
        -logical font record~188"
        -...
        -physical font record~180"
        -...
        -simple glyph program string~184"
        -...
        -compound glyph program string~186"
        -...
    -encrypted authorization key table~240"
        -bytes encrypted by first authorization key~242"
            -standardPattern~384
            -bodyEncryptionKey~382
        -bytes encrypted by second authorization key~242"
            -standardPattern~384
            -bodyEncryptionKey~382
        -...
    -error checking code of encrypted authorization key table
    -encrypted change authorization password

FIG. 15

-matchAgainstPFRsAuthorizationKeys~390
    -use hashed value to decrypt copy of PFR's entire authorization key table~392
        -if the standardPattern appears in decrypted authorization key table~394
            -if isPFREncrypted is TRUE use decrypted standardPattern's associated bodyEncryptionKey to decrypt PFR, and set isPFREncrypted to FALSE~396
            -indicate hashed value has matched one of the PFR's authorization keys~398

FIG. 16

APPARATUSES, METHODS, AND MEDIA FOR AUTHORING, DISTRIBUTING, AND USING SOFTWARE RESOURCES WITH PURPOSELY RESTRICTED USE

FIELD OF THE INVENTION

The present invention relates to methods, apparatuses, and media for authoring, distributing and using software resources, such as documents and page imaging resources, which limit certain such resources to use only for an authorized purpose, for example, such as limiting certain page imaging resources to use in the rendering of only certain documents.

BACKGROUND OF THE INVENTION

Over the last several decades there has been a constant increase in the importance of the distribution of software resources, whether they be large works such as programs, documents, videos, interactive virtual realities, and games, or smaller resources such as fonts, images, or sounds, which are used in conjunction with, or as part of, such larger works. As an increasing number of people make their living creating and distributing software, it becomes increasingly important for such people to prevent unauthorized use of their products and services. This is particularly true since it is often extremely easy to copy software resources.

Among important types of software resources are page imaging resources, such as graphics, images, and fonts, which are used in rendering the images of documents, such as printed pages, World Wide Web pages, or interactive video screen images. Since an individual page imaging resource is often intended to be used in multiple different places by multiple different documents, it often makes sense to store and distribute them as separate files. For example, on the prior art World Wide Web, image resources used by Web pages are stored and distributed as separate files, each of which has a separate addresses on the Internet defined by a URL, or Uniform Resource Locator. A Web page contains a reference to each such resource it uses. Each such reference identifies its associated resource's URL within a non-displayed tag field contained in the text of its Web page.

A somewhat similar system has been created by the assignee of the present application, Bitstream Inc., which uses tag fields in Web pages to identify the URLs of portable font resources ("PFRs"). PFRs are page imaging resources which define the shape of fonts to be used in rendering a Web Page. By sending a PFR with a page, the page can be rendered with the exact same fonts as was intended by the page's author, whether or not the computer viewing the given page has those fonts installed in its operating system. After a Web page has been accessed from over the Internet, PFRs identified in the page's PFR tag fields can be requested from the network and, once received, can be used by a Web browser to render the text of the page with the intended fonts. This system enables a Web site author to copy into one or more PFRs the shapes of any characters in any fonts which occur in his Web site, as those shapes are defined by an original font description installed in the font manager of the operating system of his computer. A URL pointing to a PFR is placed in a tag field in any Web page which uses the PFR's character-font shapes. This system is described in much greater detail in U.S. patent application Ser. No. 08/527,518 (hereinafter "The 1995 TrueDoc Application"), entitled "Apparatus and Methods For Creating And Using Portable Fonts", filed by John S. Collins et al. on Sep. 12, 1995, which application is incorporated herein by reference in its entirety.

The system described in the 1995 TrueDoc Application uses the assignee's TrueDoc™ technology. This technology enables the character-font descriptions placed in a PFR to copy the shape, but not other aspects of the original font descriptions in a Web site author's computer from which the PFR's font descriptions are derived. This is valuable because the law has held that shapes of fonts are not copyrightable, and, thus, this enables PFRs to be legally used by remote computers for the purpose of displaying Web pages with their intended fonts without the need for copyright licenses or negotiations. But the assignee of the present invention is itself in the business of designing fonts, and wishes to strike a reasonable balance between the need to make it easy for fonts be used and viewed in electronically distributed documents, and the need to enable those who design fonts to obtain a sufficient financial reward for doing, so as to encourage the creation and telling of new fonts.

From the standpoint of those in the business of selling fonts, allowing documents created with licensed fonts to be viewed on computers for which those fonts have not been licensed is actually beneficial, because it increases the benefits of using—and, thus, the market for—a larger number of fonts. But to those who sell fonts allowing people to create and have other computers view documents without ever having licensed fonts is not beneficial. Unfortunately, it would be possible for people to create PFRs containing complete character sets of many fonts and then make them freely available on the Internet. These PFRs could then be used in the Web pages of others who have never licensed such fonts, merely by placing a PFR tag field pointing to such PFRs in their Web pages. If it became common knowledge that this could be done, PFRs distributed over the Web could have a negative impact on the market for properly licensed fonts.

Although the above discussion has been made with reference to portable font resources, the same issues apply to many other forms of software resources. This includes other types of page imaging resources, such as graphics and images. It also could apply to sound resources or software resources, such as, for example, Java applets.

The issue of undesired use of distributed software resources also applies to resources distributed by means other than the Internet, including the distribution of resources via interactive TV or physical recording media, such as floppy disks or CD-ROM.

SUMMARY OF THE INVENTION

It is an object of the present invention to provide apparatuses, methods, and media for authoring, distributing, and using software resources in a manner which restricts the use of such resources in a desired manner.

It is yet another object of the present invention to provide such apparatuses, methods, and media which restrict certain software resources to use with certain other software resources.

It is still another object of the present invention to provide such apparatuses, methods, and media which are easily adapted to the distribution of resources over computer networks and on recorded media.

According to one aspect of the invention a computerized system is provided for authoring documents. The system enables a user to create and record on computer readable media one or more documents. The system records in such a document an indication of one or more page imaging resources which can be used in rendering the document. It enables a user to selectively specify with which of one or more of documents a given page imaging resource is authorized for use. The system creates and records on computer readable media one or more of such page imaging resources containing information for use in rendering the image of one or more documents; and it creates and records on the media in association with a given page imaging resource an authorization code indicating with what one or more documents the given page imaging resource is authorized for use.

The invention also relates to computer readable media of the general type created by such an authoring system. In a preferred embodiment the media stores data representing one or more documents; one or more page imaging resources; and an authorization code indicating what page imaging resource is authorized to be used to render the image of what document. Often the documents and page imaging resources will be stored as separate files and an individual authorization code will be stored as part of each page imaging resource. Often the authorization code will represent one or more addresses, each corresponding to all or part of the address of a document with which its associated page imaging resource is authorized for use. In some embodiments the media also records software for rendering the documents which are recorded on it, including programming for controlling whether or not a given page imaging resource is used to render a given document as a function of whether or not the given page imaging resource's associated authorization code indicates the page imaging resource is authorized for use with the given document.

The invention also relates to a computer system for making the information stored in such media available over a computer network. In such systems, the addresses represented in the media correspond to addresses in a computer network address space. The system includes means for making the documents, page imaging resources, and authorization codes available over the network in response to requests from other computers. The system responds to a request for a document from a remote network by sending the document over the network to the requesting entity. It responds to a request from a remote network entity for a page imaging resource referred to in a previously transmitted document by sending the page imaging resource and its associated authorization code over the network to the requesting entity.

The Invention also relates to a computer system capable of using resources, such as those described above, received from media or a computer network. Such a system receives each of one or more resources from a source address within an address space. Preferably the address space is a hierarchical address space, such as that created by computer file systems or Internet URL addresses. The system receives in association with one of the resources an authorization code which represents one or more addresses within the address space. The system detects the source address from which one of the resources is received, and then controls what, if any, use is made of a given resource as a function of whether or not the detected source address matches one of the addresses represented by the authorization code.

In many embodiments of this system, the resource for which the source address is detected is a document, and the system controls whether or not a page imaging resource can be used to render the document as a function of whether or not the document's source address corresponds to an authorization code associated with the page imaging resource. In some such embodiments, the system receives the document over a network. The document contains references to the page imaging resources which can be used to help render it. The system then makes separate requests for the referenced page imaging resources over the net. In many embodiments, the document and page imaging resources are received as files, and the authorization code is part of the documents associated page imaging resource's file. Often the authorization code includes a hash of all or a part of the file address of one or more documents with which the page imaging resource is authorized for use. This system compares a hash of the given document's source address against the one or more hashed addresses represented by the page imaging resource file's authorization code to determine if the page imaging resource can be used to render the document. Preferably the authorization codes are transmitted in an encrypted manner to make improper modifications of them more difficult.

In some embodiments of the invention an authorization code, called a "certificate", is used which is not part of a page imaging resource. The system which receives such a certificate detects the source address from which it came. The page imaging resources intended to be used with one or more certificates include an authorization code identifier which corresponds to the one or more certificates it is authorized for use with. A page imaging resource can be authorized to render a document by a given certificate if the document's detected source address equals or is hierarchically under the detected source address of the certificate; and if the page imaging resource's authorization code identifier corresponds to the certificate.

In some embodiments, authorization codes determine with what documents a given page imaging resource can be used by means other than the address of such documents. For example, the authorization code can represent a document with which a page image resource is authorized for use by a hash derived from all or a portion of the document's text, or by an attribute of the document's file, such as its author, or by some other identifying feature.

BRIEF DESCRIPTION OF THE DRAWINGS

These and other aspects of the present invention will become more evident upon reading the following description of the preferred embodiment in conjunction with the accompanying drawings, in which:

FIG. 2 illustrates a portion of an HTML file which contains special PFR tag fields identifying PFRs for use in displaying the HTML file's text and a special CERT tag field identifying a certificate which authorizes one or more of those PFRs for use with the document;

FIG. 3 is a highly simplified pseudo-code description of the functions performed by the server software of the server computer, shown in FIG. 1, which sends documents and PFRs over the Internet in response to requests from client computers;

FIG. 5 is a highly simplified pseudo-code description of the functions performed by the MakePfrsForFiles program, which creates a PFR file for a set of HTML text files, which places tag fields pointing to the resulting PFR or certificate in such HTML files, and which places one or more authorization keys in the resulting PFR file indicating which documents the PFR file authorized for use with;

FIG. 6 is a highly simplified description of the data structure of a PFR created by the MakePfrsForFiles program shown in FIG. 5;

FIG. 7 is a highly simplified description of the data structure of a certificate which can be created by the MakePfrsForFiles program of FIG. 5 to authorize one or more PFRs for use with all document files in the certificate's directory or in any directory below it;

FIG. 9 is a highly simplified pseudo-code description of the functions performed by the browser software of the client computer, shown in FIG. 1, which accesses documents and PFRs from over a computer network or from a CD-ROM, and which renders images of such documents with PFRs which are authorized for use with such documents;

FIG. 10 is a simplified description of the PFR cache, PfrAccessTable, OpenedDynamic PhysicalFontList, and the OpenedDynamicLogicalFontList data structures which are used to render a character from a dynamic font, that is, a font which contains font descriptions m multiple PFRs;

FIG. 11 is a highly simplified pseudo-code description of the functions performed by the requestURL routine called by the browser software of FIG. 9 to request a given URL either from over the Internet or from a computer's own mass storage system;

FIG. 12 is a highly simplified pseudo-code description of the functions performed by the renderPagewithPFRs routine called by the browser software of FIG. 9 to render a given document with PFR defined font shapes;

FIG. 13 is a highly simplified pseudo-code description of the functions performed by the CspDoString routine called by the renderPageWithPFRs routine of FIG. 12 to render the font shape of a string of characters using PFRs which CspDoString determines are authorized for such use;

FIG. 15 is a highly simplified description of the data structure of a PFR used with an alternate embodiment of the invention in which the body of the PFR is encrypted by a key which is made available when the PFR is used in conjunction with an authorized document; and FIG. 16 is a highly simplified pseudo-code description of the functions performed by the matchAgainstPFRsAuthorizationKey routine which is called in the alternate embodiment of the invention used with the PFRs of FIG. 15 to determine if such a PFR has an authorization key matching a given document or certificate, and, if so, decrypting the body of that PFR.

DETAILED DESCRIPTION OF PREFERRED EMBODIMENTS

Figure 1:
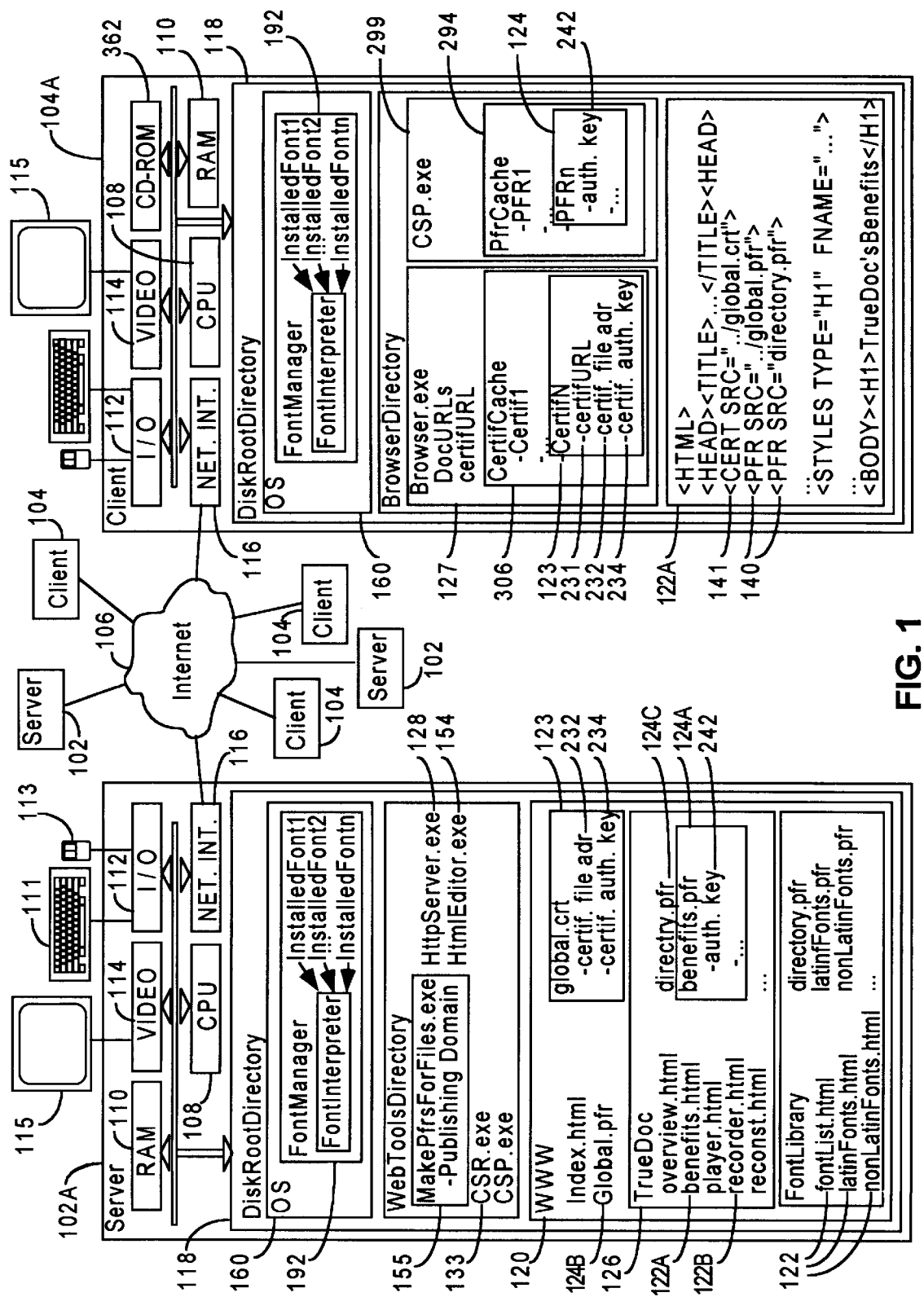
FIG. 1 is a highly simplified block diagram of an embodiment of the invention which includes a server computer, upon which documents and associated PFRs with associated authorization codes can be created and then made available over the World Wide Web, and a client computer which can access such documents and portable font resources from over the World Wide Web or from a CD-ROM and then display documents with authorized PFRs.

Referring now to FIG. 1, an embodiment of the invention will be described which is designed to be used as part of the Internet's World Wide Web (the "Web"). The preferred system includes a plurality of Web server computers 102 and a plurality of Web client computers 104 which are connected to each other over the Internet network 106. The clients 104 address and send requests for information to specific servers 102 over the network, and the individual servers each address and send the requested information back over the net to the client that requested it. Some computers act as both clients and servers. In FIG. 1 one server computer 102A and one client computer 104A are shown in more detail.

In a typical embodiment, each of the computers 102A and 104A include the following: one or more CPUs 108 for executing computer instructions and reading and writing data; a random access memory (or "RAM") 110 for storing instructions execution by the CPU and data read or written by the CPU; an I/O interface 112 which communicates with devices such as the keyboard 111 and the mouse 113; a video interface 114 which generates signals to draw desired images on a video monitor 115; a network interface 116 for receiving and sending messages over the network 106; and a mass storage device, such as a hard disk 118, for storing more information than will fit in RAM 110 at one time and for permanently storing information when the computer is shut off.

In FIG. 1 the hard disk 118 of server computer 102A includes a directory www 120 which holds files for a hypothetical Web site which might be used by the assignee of the present invention. This data includes HTML files 122, having the file extension name ".html", and PFR files 124, having the file extension name ".pfr". "HTML" stands for "HyperText Markup Language." As is shown in FIG. 2, an HTML file contains ASCII text to be displayed and non-displayable tags which can identify the formatting of the text, the names of images files to be displayed in the text, and links to other parts of the same HTML file or to other HTML files. As will be explained below, the embodiment of the invention shown in FIGS. 1 and 2 uses some possible extensions to the HTML language to define tag fields in addition to those defined by the standard HTML language.

In the example of FIG. 1, the www directory contains the "home page" HTML file of the Web site, index.html. The home page is designed to be the first screen seen by users of a Web site and to provide a jumping off point to the most commonly used parts of the site. The www directory includes a plurality of sub-directories, including the truedoc directory, which includes HTML files about the product TrueDoc, the commercial embodiment of PFR technology described in The 1995 TrueDoc Application, and a fontlibraries directory which contains HTML files about various fonts sold by the assignee of the present invention.

The server computer contains a server program 128 whose main function is to send HTML, PFR, certificate, and other files to client machines which request them. As shown in FIG. 3, the main function of this program is to continuously perform a loop 129, which repeatedly waits for the receipt of an HTTP message from over the internet.

HTTP stand for Hypertext Transfer Protocol, a messaging protocol used to transfer information on the Web. Each HTTP request message contains a URL, or Uniform Resource Locator, identifying the requested file by the Internet address of its server and its full path name on that server. The HTTP request also includes the Internet address of the client requesting the file.

When Step 130 of FIG. 3 detects the arrival of such an HTTP message, it accesses the file identified by the message's URL and sends it back on the net to the return address in the HTTP message.

The client computer 104A shown in FIG. 1 contains a browser program 127. This program is described below in more detail with regard to FIG. 9. The browser sends HTTP requests for HTML files and then displays them on the screen 115 of its computer for a user to see. For example, when the browser displays the HTML file shown in FIG. 2 on its screen using the PFRs identified in that file, it has the appearance shown in FIG. 4. The user can navigate through the Web by using his mouse to click on portions of the documents which contain links to other documents or to other parts of the same document. If the user clicks on a links containing a URL of another document, the browser sends an HTTP request for that other document over the net addressed to the server having the host name specified in the URL. When the addressed server receives the HTTP message, it sends the requested file to the browser. When browser receives the requested file, it then displays it on its screen. This ability to navigate through screens from all over the world by merely clicking on highlighted or underlined links, is one of the great powers of the Web.

FIG. 2 show an HTML file, benefits.html 122A, which is written in what would be standard HTML, except for some additional tag fields described in The 1995 TrueDoc Application and one additional tag field used with the embodiment of the present invention shown in FIG. 1.

As can be seen from FIG. 2, HTML tags start and end, respectively, with the "<" and ">" characters. FIG. 2 shows some of HTML's formatting tags, including "<Hn>" and "</Hn>", for marking the start and ends, respectively, of nth level headings; "<P>" and "</P>") for marking the start and end of normal paragraphs; "<UL>" for marking the start of an unnumbered list; and "<LI>" for marking the start of each item in a list.

Standard HTML includes link tags of the form

<A HREF="LinkReference">text</A> where the LinkReference referred to in the HREF attribute is a URL specification and text is the portion of displayable text to be displayed differently, to indicate that if a user clicks on it, the browser will access and display the document defined by the URL.

In FIG. 2 some of the link tags are indicated by the numeral 131. In this figure all of the URL specifications in these link tags are relative references, which identify the files referred to by their address relative to the HTML file in which such references are contained. Relative addresses can be used to refer to any file descending from the same root directory as the HTML file in which they occurs. A path name occurring by itself in a relative address identifies a file whose full path name is that of the directory in which relative address's HTML file occurs with the relative address's path name appended to it. If the relative address's path name is preceded by n occurrences of ". . . l", the relative address's path name is appended to the path of the HTML file n levels above the HTML file's current directory.

Not all file references in HTML text are by relative address. If an HTML file refers to a file on other hosts it must usually do so by including a complete URL, rather than just a relative address. A complete URL has three parts: a protocol part, a host name part, and a full path file name part. For example, the full URL for accessing the HTML file benefits.html 122A shown in FIG. 1 would be http://bitstream.com/www/truedoc/benefits.html In this example, the host name protocol, "http://", specifies that the URL is to be sent and received according to the Hypertext Transfer Protocol, the major protocol used for accessing files on the Web. The hostname part, "bitstream.com", is the Internet protocol, or IP, address of the server computer 102A on the Internet. Finally the full path file name part, "www/truedoctbenefits.html" identifies the specific file "benefits.html" by its path name, that is, its file name preceded by a hierarchical list of the directories in which it is included. In the examples, these directories are "www" 120 and "truedoc" 126. The path file name part of a URL represents a hierarchical address, since it can identify a file by a position in a possible hierarchy of directories and sub-directories.

When a URL specification containing a relative reference is read by a browser on a computer other than that containing the actual address of the HTML file in which the reference occurs, the browser has to convert the relative reference to a complete the URL before it can access the referenced file. This is done by defining the reference relative to the URL which the browser used to get the HTML text file in which the reference occurs. For example, if a browser on another machine has obtained the HTML file benefits.html by using the URL http://bitstream.com/www/truedoc/benefits.html the HREF attribute "recorder.html" contained in tag 131A of FIG. 2 would identify a file 122B, shown in FIG. 1, named recorder.html in the same directory as benefits.html. Thus, if the user clicked on the text "recorder" 132 shown in FIG. 4, associated with recorder.html's link, the browser would access recorder.html by generating the URL http://bitstream.com/www/truedoc/recorder.html In this specification and the claims that follow, we refer to a relative address as a URL specification, because a relative address, when read by a machine other than that on which its HTML file resides, is completed to specify a complete URL.

The embodiment of the invention shown in FIG. 1 uses the suggested improvements to HTML described in The 1995 TrueDoc Application which enable Web page authors to use fonts freely, to exercise almost total control over how such files are shown across the net, and to enable the display of such fonts across the net with minimal increase in communication time. To do so it uses the following non-standard HTML tag fields: PFR, STYLE, NONCHAR, and LFONT.

With the exception of the STYLE tag, none of these tags have yet been approved by the World Wide Web Consortium (the "W3C"), which currently is the only body which can authorize official extensions to HTML. It should be appreciated, however, that the functions performed by these tags can be achieved by use of features which currently have been approved by the W3C or which have been proposed by the W3C in a working-draft document entitled "Web Fonts", WD-font-970721, W3C Working Draft Jul. 21, 1997. This document can be found at http://www.w3.org/TR/WD-font. The extensions proposed in this document define how web pages should identify fonts within the body of the page's text, and how to reference the resources used to render the page. Many of the extensions contained in this working draft have already been incorporated in several major web browsers.

The PFR tags 140 used by the embodiment of the invention shown in FIGS. 1 and 2 have the form <PFR SRC="FileReference"> where FileReference is a URL specification identifying a PFR file containing font descriptions necessary for the display of fonts contained in the document. PFR tags do not enclose any text since they apply to a whole file. A file can contain multiple PFR tags, because the invention disclosed in The 1995 TrueDoc Application allows a document's fonts to be rendered from more than one PFR file. The PFRs shown in FIG. 1 vary from those shown in The 1995 TrueDoc Application because they each contain an authorization code comprised of one or more authorization keys 242, shown in FIG. 1, which limit which documents they can be used with. Currently, the function performed by the PFR tag can be performed using LINK tags which have been approved by the W3C.

STYLE tags 142 have the form

<STYLES TYPE="TextType" FNAME="LogicalFontName" INDENT="Indent" . . . > where TextType specifies a type of formatted text identified by HTML's format tags, such as <H1>, <H2>, or <P>. LogicalFontName specifies the logical font to be associated with the tag's TextType. Indent specifies the amount by which the TextType is to be indented. In addition to FNAME and INDENT, other formatting attributes also can be included. A separate STYLES tag is used to change the format of each text type. The HTML author need not include STYLE tags for each text type, nor all formatting attributes for each STYLE tag. This is because browsers designed to read STYLE tags will use the values in a browser's standard styles table for all text types and text type formatting attributes which are not defined by a given document's STYLE tags. STYLE tags do not enclose any text since they apply to a whole file. The STYLE tag has been approved for use by the W3C.

NONCHAR tags 144 have the form

Figure 4:
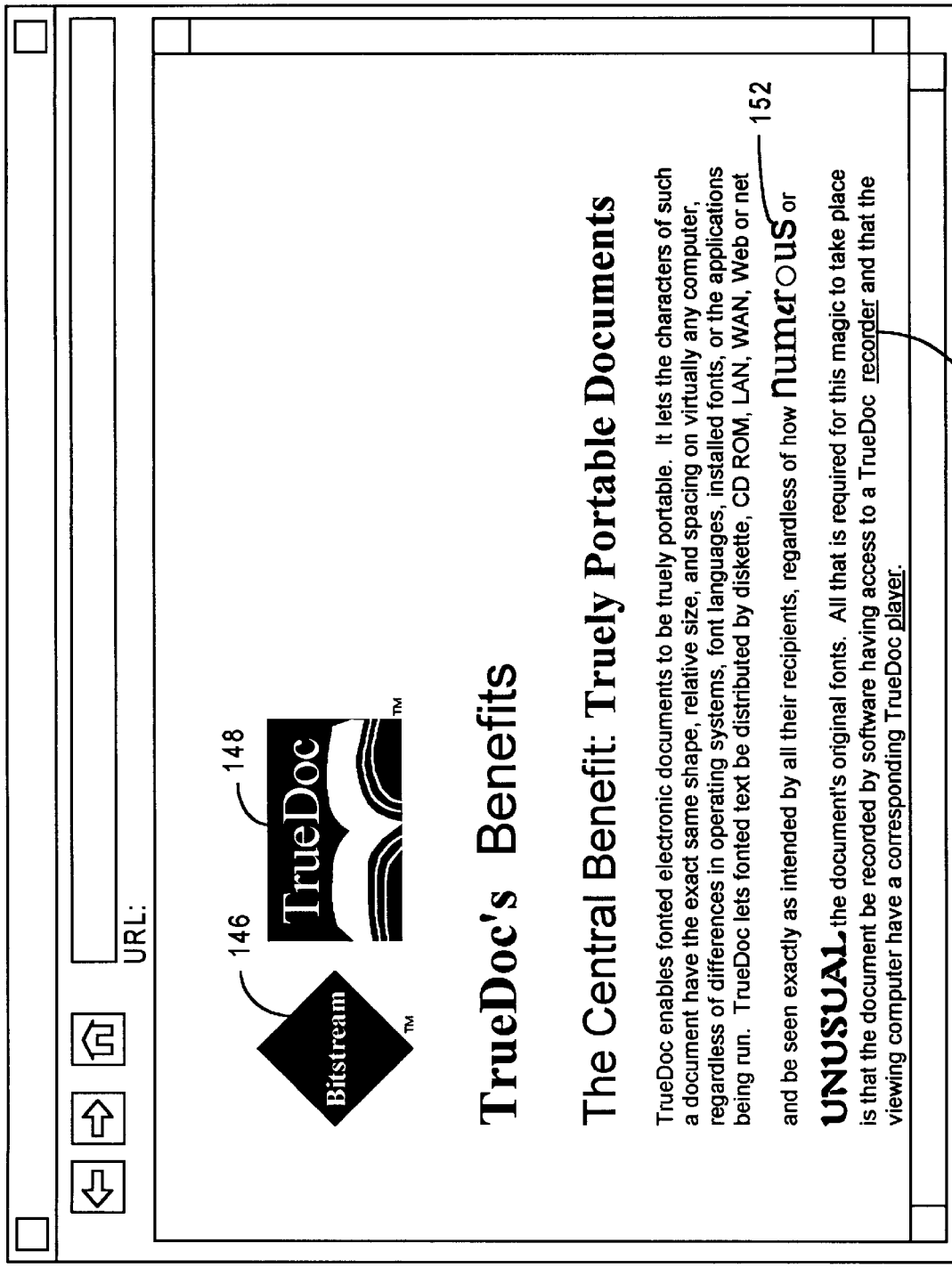
FIG. 4 illustrates what a portion of the HTML file shown in FIG. 2 looks like when rendered by the browser program of FIG. 9.

<NONCHAR FNAME="LogicalFontName" CHARCODE="charCode"> where LogicalFontName specifies the logical font of a font containing a non-character shape, such the shapes 146 and 148 shown in FIG. 4. "charCode" is the charCode in the identified logical font of the desired outline image.

The character shape recorder ("CSR") 133 shown in FIG. 1 is very similar to the CSR described in The 1995 TrueDoc Application., It converts character-font shapes described by font resources installed in the font manager 192 of an authoring computer 104A into the font descriptions contained in the system's PFRs. It can translate virtually any shape described in terms of outlines into a PFR font description, which can then be rendered as if they were text characters. As is explained in The 1995 TrueDoc Application, all that is required is for the recording software which uses the CSR to record shapes to call a CSR function, CsrDoChar, which the CSR module uses to record shapes, for the non-character shape. The page recording software should then respond to a resulting call back from the CSR by feeding the shape's outlines to the CSR through calls to CSR subroutines CsrMoveTo, CsrLineTo, CsrQuadraticTo, and CsrCubicTo. These calls define a given shape to the CSR as a sequences of non marking moves, straight lines, quadratic Bezier curves, and/or cubic Bezier curves, respectively.

Once such a shape has been formed into a font description recorded by the CSR into a PFR file, the NONCHAR tags let Web page authors have outline based graphics displayed on Web pages. This is a great advantage because such outline based graphics are normally much more compact, and thus can be transferred much more rapidly than the bitmapped images commonly used to display graphics on Web pages. NONCHAR tags do not enclose text between matching opening and closing tags, as do most formatting tags. This is so the character corresponding to charCode will not be rendered if the browser displaying the HTML file does not have the capability of rendering NONCHARs.

The NONCHAR tag has not been approved or proposed by the W3C, but those skilled in the use of HTML will understand that an equivalent function can be performed in current HTML using "&TEXT;".

LFONT tags 150 have the form

<LFONT FNAME="LogicalFontName">text </LFONT> where LogicalFontName specifies the logical font of the font to be applied to text between the opening and closing LFONT tags. This tag is used to enable HTML authors to specify fonts on other than the basis of standard HTML text types. For example, the LFONT tags 150A in FIG. 2 enable the user to specify a separate font for each letter of the word "numerous" shown at 152 in FIG. 4, which occur in the middle of a portion of HTML paragraph text.

The W3C has approved a FONT tag which is identical to the LFONT tag described above except for the difference in spelling between "FONT" and "LFONT".

The CERT tag 141 is a new innovation related to the invention of the present application. CERT tags have the form <CERT SRC="FileReference"> where FileReference is a URL specification identifying a certificate file 123 of the type shown in the www directory of server 102A in FIG. 1. As will be described below in greater detail, such a certificate file enables a PFR having an authorization key 242 corresponding to an authorization key 234 stored within the certificate file to be used to render fonts in any document contained in, or hierarchically below, the directory in which the certificate is placed. Note that CERT tags do not enclose any text since they apply to a whole file.

The W3C has not yet approved or proposed the use of the CERT tag. A function equivalent to that of a CERT tag can be obtained using the LINK tag which has been approved by the W3C.

In FIG. 1's embodiment of the invention, the HTML author can create all of an HTML text except the PFR and CERT tags using a standard text editor or HTML text editor. Preferably, however, the author has access to an editor, such as htmleditor.exe 154, which functions like a normal HTML editor except that it contain a browser, which, like the browser 127 of the client 104A, is responsive to PFR, STYLE, NONCHAR, LFONT, and CERT tags. It should be understood that HTML text need not be created on the same computer as the server which distributes it.

The PFR and CERT tags are inserted in HTML files by a program MakePfrsForFiles.exe 155, shown in FIGS. 1 and 5. The description of this program which will be described below with regard to FIG. 5 is highly simplified and only shows how a single PFR can be created for a given body of text comprised of one or more files. It focuses on the aspects of MakePfrsForFiles which are relevant to the invention of this application, that is, the insertion of authorization keys into PFRs, the creation of certificate files, and the insertion of PFR and CERT tags into HTML files. It should be understood, however, that in the preferred embodiment of FIG. 1, these aspects are combined with the more complex, but more flexible features of MakePfrsForFiles described in The 1995 TrueDoc Application. These more flexible features allow MakePfrsForFiles to make just one PFR for a selected body of text, or a plurality of them. At also allows MakePfrsForFiles to associate a first PFR file with the basic fonts used in most of a Web site, such as global.pfr 124B in FIG. 1, a second PFR with any fonts not in global.pfr which are commonly used in a given Web directory, such as directory.pfr 124C in the truedoc directory of FIG. 1, and a third PFR, such as benefits.pfr 124A in FIG. 1 for the fonts of an individual file which do not occur in global.pfr or any of the file's ancestor directories' PFRs. This feature of breaking the portable font descriptions for a large body of text into multiple PFRs, such as the hierarchy of global.pfr, directory.pfr, and benefits.pfr just described, can reduce transmission hUme when the browser of a client has a PFR caching scheme which saves PFRs as it moves to a new HTML file. Under this scheme the browser only requests the transmission of a PFR listed in the PFR tags of a new HTML file if it does not already have that PFR cached. It also makes it much easier to manage the PFR's in a large Web site, since it makes incremental changes to a set of PFRs representing the site easier.

Referring now to FIG. 5, the MakePfrsForFiles program performs a loop 170 for each document, or file, for which it is to form a PFR. This loop, in turn, performs a loop 172 for each character in the document of the current iteration of loop 170. For each such character loop 172 causes three Steps 174, 176 and 178 to be performed. For those who are familiar with the description in The 1995 TrueDoc Application, all of these steps are performed by calling the CsrDoChar function of the character shape recorder, or CSR, which is described in that application.

Step 174 tests to see if a physical font record 180, shown in FIG. 6, has already been created for the physical font associated with the current character of loop 172 by MakePfrsForFiles.

In scaleable fonts, that is fonts which can be shown in different sizes or with other different attributes, such as italics, a physical font defines the basic shapes of a font, independent of size or display attributes. For example, "Arial" defines a physical font. A logical font defines an associated physical font, a point size, and display attributes of the font, such as whether it is italicized or not. A logical font might have a name like "Arial 12", meaning a font having shapes defined by the Arial physical font and a 12 point size. FIG. 6 gives a simplified description of a PFR data structure. As it indicates, each PFR has one or more physical font records 180 which identify the physical font and shape-related information relative to an entire physical font and which includes one or more character records 182 which point to the location in the simple glyph program string 184 or the compound glyph program string 186 which defines the actual sequence of moves, lines, and curves which describe the shape of an associated character in that physical font. Each PFR also includes one or more logical font records 188, each of which identifies the associated physical font, point size, and other attributes of the logical font. The PFR also includes a logical font directory which lets the system access a logical font record by an associated font code.

If Step 174 determines that a physical font record has not yet been created for the current character's physical font, it causes one to be created by requesting the necessary information to create such a record from the font manager 192, shown in FIG. 1, of the operating system 160 of the computer in which it is running. The font manager, in turn, a obtains this information from a font resource installed within it which defines the physical font.

Step 176 of FIG. 5 then tests to see if a logical font record 188, shown in FIG. 6, has already been created for the PFR for the logical font of the current character of the loop 172. If not, it obtains the necessary information from a font resource installed in the font manager 192 of the computer running MakePfrsForFiles and creates such a record.

Step 178 then tests to see if a character record has been created for the current character of loop 172 in the current physical font, and, if not, it obtains a sufficient description of the moves, lines, and curves necessary to describe the shape of that character in its font from a font resource installed in the font manager 192, and then it creates such a record.

Once the loops 172 and 170 have been performed, respectively, for every character in every file for which the PFR is being created, Step 194 records all of the logical font records 188, the physical font records 180, and the character records 182 created in the loop 170 into a PFR, as shown in FIG. 6. It also records the logical font directory 190 shown in FIG. 6.

Figure 8:
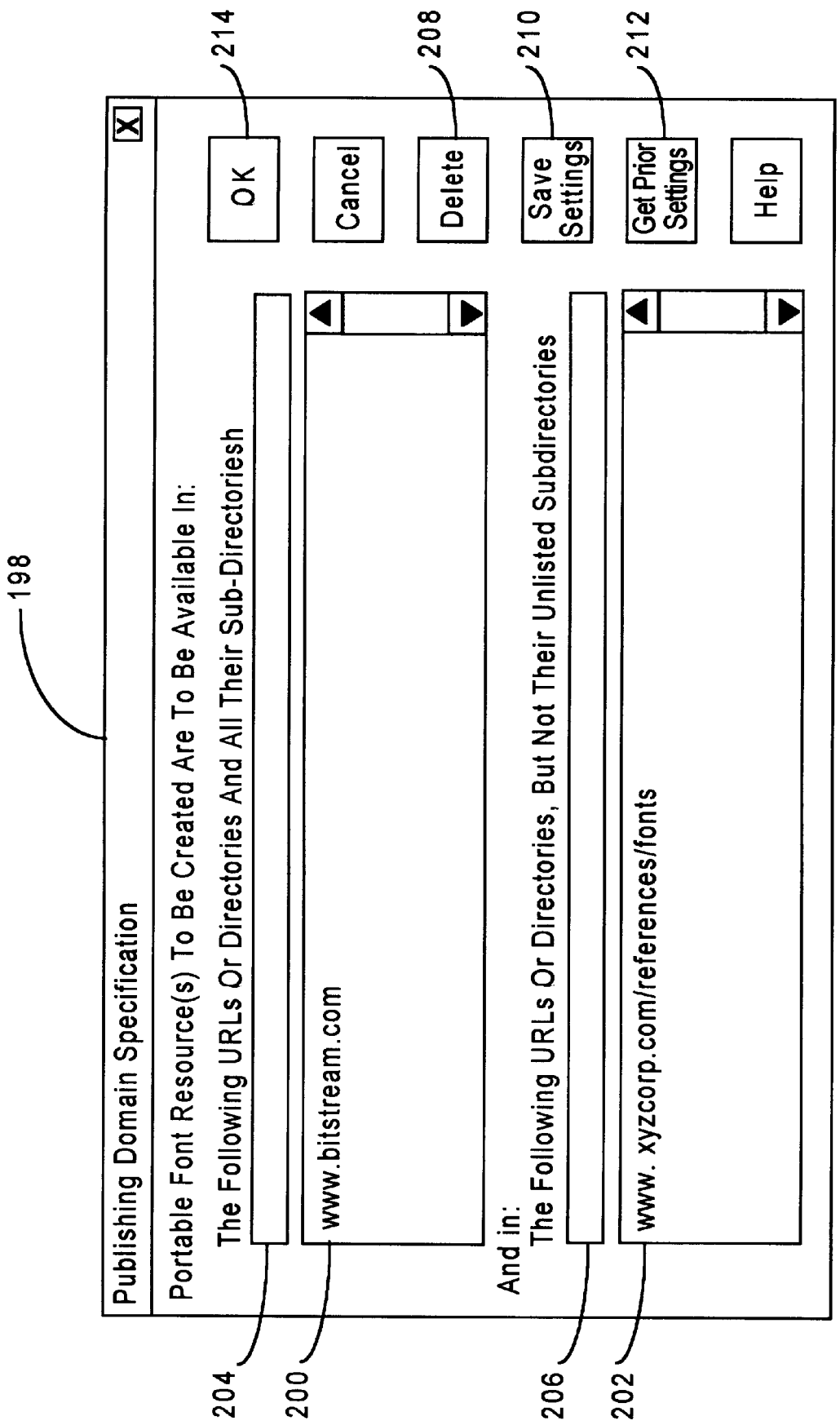
FIG. 8 illustrates the Publishing Domain dialog box which is used by the MakePfrsForFiles program to enable a user to specify with which documents the PFR created by the MakePfrsForFiles program of FIG. 5 is authorized for use.

Step 196 prompts for a publishing domain by displaying the Publishing Domain dialog box 198 shown in FIG. 8, with the last value left in the dialog box, if any, being displayed. The dialog box 198 includes two list boxes 200 and 202, each capable of listing one or more URL path names. Each of these list boxes 200 and 202 has a respective edit box 204 and 206 to enable the user to enter a new URL path name into that list box. A Delete button 208 allows a user to delete one or more selected URL path names from a list box. Button 210 enables a user to selectively name and save the current settings of the list boxes 200 and 202. Button 212 allows the user selectively reload a previously named and saved set of settings back into the list boxes 200 and 202. Each URL entry in the list boxes 200 and 202 identifies a directory, either on the computer running MakePfrsForFiles or on another computer.

If a given directory is entered in list box 200, that indicates the PFR being created is authorized to be used in rendering any documents coming from the given directory or any directory under it. We will call such directories "fully-authorized", since all documents in and under them are authorized for use with the current PFR. If a given directory is entered in list box 202, that indicates the PFR being created is authorized to be used in rendering any documents coming from that given directory itself, but not any directories under it, unless those directories are separately entered in the list box 202. We will refer to directories in list box 202 as being "individually authorized", since only documents directly in them are authorized for use with the PFR being formed.

When the user is satisfied with the publishing domain defined by the entries in the list boxes 200 and 202, she or he selects the OK button 214. At this point if the publishing domains defined by those list boxes do not include an appropriate publishing domain, a dialog box indicating the nature of the error will be displayed by Step 216. For example, if the user attempts to leave the Publishing Domain dialog box without any URL paths entered in the list boxes 200 and 202, the error box will state that a PFR can not be created without a publishing domain having been specified. Similarly, if the user tries to leave the Publishing Domain dialog box without a setting which covers all of the files for which the PFR is being made, the error box will display a list box showing the directories of any files for which MakePfrsForFiles is being run which are not covered by the current entries in the Publishing Domain dialog box. When the user exits from any such dialog boxes which are displayed by Step 216, the loop of Step 196 will continue to re-display the Publishing Domain dialog box until the user has entered a proper publishing domain.

Once the user has entered a proper publishing domain, a loop 218, comprised of Steps 220 and 222 is performed for each fully-authorized directory entered in the list box 200 of the Publishing Domain dialog box.

Step 220 tests to see if a certificate file 123 of the type shown in FIGS. 1 and 7 has already been created and recorded in the fully-authorized directory. If not, Step 220 calls a subroutine createCertificate to create such a certificate file 123 for the directory and then records it in that directory.

As shown in FIG. 7, the certificate file 123 includes a string of bytes 224 which identify it as a certificate file. It also includes a field 226 which enables software reading the certificate to know the version and revision of the format which the certificate uses. The certificate file also includes a block 228 of encrypted bytes. These encrypted bytes store a field 230 recording the length of the text string of the certificate's URL, minus its file name, a field 232 recording the actual text of the certificate's URL, minus its file name, and an authorization key 234 derived by a hash from the certificate's URL, minus its file name. After the encrypted bytes 228 the certificate records an error correction code 236 for the encrypted bytes 228 and then a field storing multiple encryption keys for the encrypted bytes.

Once Step 220 of FIG. 5 either finds or creates a certificate file corresponding to the fully-authorized directory, Step 222 calculates an authorization key from the URL of the certificate file, minus its file name, using the same hash algorithm used to create an authorization key identical to that recorded in field 234 of the certificate before that field was encrypted. Step 222 records this hashed value as one of the authorization keys 242 in the authorization key table 242, shown in FIG. 6, for the PFR being formed by MakePfrsForFiles.

Once loop 218 of FIG. 5 has been performed for each fully-authorized directory, a loop 244 performs a Step 246 for each individually-authorized directory identified in the list box 202 of the Publishing Domain dialog box. Step 246 hashes the text of the URL of the individually authorized directory (which does not include a file name) and stores the resulting authorization key 242 at the next location in the authorization key table being formed for the PFR being made. The hash algorithm used in Step 246 and Step 334 of FIG. 13 discussed below can either be the same as or different from the hash algorithm used to calculate certificate authorization Keys 234, shown in FIG. 7, and used in Step 222 to calculate corresponding authorization keys in PFRs.

Once the loop 244 is complete, the PFR's authorization code, or authorization key table, 240 shown in FIG. 6 is complete, and Step 248 calculates an error correcting code 250 for the values in that table, and then records it in the PFR after that table. Once this is done, a Step 252 prompts for a change authorization password, i.e., a password which will enable a user to modify the authorization of the PFR at a future time, and then it hashes that password and stores the resulting bytes 254 at the end of the PFR. Once this is done, Step 256 encrypts the authorization key table. Multiple encryption schemes can be used in this encryption. Once this encryption is done the PFR is complete and the execution of MakePfrsForFiles is finished.

FIG. 9 is a very simplified pseudo-code description of the browser program 127 shown more abstractly in FIG. 1. This program includes a main loop 258 which repeatedly checks in Step 260 for messages in a message queue.

If the next message in the queue identifies the URL of a new Web page, Step 261 causes Steps 262 and 268 to be performed. Step 262 calls the requestURL routine 263 illustrated in FIG. 11. As shown in FIG. 11, this routine tests in Step 264 if the URL identifies a file on another machine. If so, Step 264 sends an HTTP request for the file to the other machine over the network. Otherwise, if the URL indicates a file on the browser's own computer, Step 266 generates a request to its computer's operating system for the file. In either case Step 268 saves the Web page's URL in a variable docURL associated with the individual page.

Returning to FIG. 9, once the Web page requested by requestURL in Step 262 has been received by the browser, a corresponding message will be placed on the message queue and shortly thereafter Step 260 will obtain that message and Step 270 will cause Steps 272 to 278 to be performed for the received Web page.

Step 272 makes a quick initial display of the page before requesting any page imaging resources, such as image or PFR file, pointed to by URLs in the received page.

Step 274 then performs a loop for each page imaging file referred to in the Web page by a URL which is of an active type. Normally most page imaging resources are active unless they are of a type the browser has not been programmed to handle or unless the user has set a preference indicating he does not want such page imaging resources used in rendering Web pages. If the page imaging file of the current loop of Step 274 is in a PFR tag field, Step 276 checks to see if the PFR identified in that field is already stored in the PFR cache 294 shown in FIGS. 1 and 10. If not, Step 276 calls the requestURL routine of FIG. 11 to request it, either from another machine or from its own mass storage system. Similarly, if the page imaging file is in a CERT field, Step 277 checks to see if the certificate referenced is already in a certificate cache 306 shown in FIG. 1. If not, it calls requestURL to ask for it.

If the loop 274 has found that all of the Web page's PFR and certificate files are already cached, the browser already has all the PFRs and certificates necessary to render the text of the current document with PFRs, and, thus, Step 278 calls the renderPageWithPFRs routine 280, described below with regard to FIG. 11, to render the Web page's text with the fonts referenced in the page's PFR tag fields.

If Step 276 has requested any URLs, each time such a URL is received by the browser a corresponding message will be placed on the message queue. Soon thereafter Step 260 will obtain that message from the queue and Step 282 will cause Steps 284 and 286 to be performed.

Step 284 decrypts the PFR's encrypted authorization key table 240 shown in FIG. 6, and then installs the PFR in the PFR cache 294 shown in FIGS. 1 and 10, and it installs the physical and logical fonts defined by the PFR's physical font records 180 and logical font records 188, respectively, in the OpenedDynamicPhysicalFontList 288 and OpenedDynamicLogicalFontList 290 shown in FIG. 10. The PFR cache 294 and the lists 288 and 290 allow the CSP, or character shape player, 299, shown in FIG. 1, to define one or more dynamic logical fonts 281, each of which has all of the character shapes defined in all physical font records 180 for the corresponding physical font in all PFRs currently loaded in the PFR cache 294. The fonts are dynamic because which characters are available in which fonts varies as a function of which PFRs are currently cached. Each currently opened logical font 281 listed in the OpenedDynamicLogicalFontList 290 has a pointer to its corresponding physical font's entry in the OpenedDynamicPhysicalFontList 288, which, in turn, has pointers 283 to all physical font records for that physical font currently loaded in the cache. As can be seen in the example of FIG. 10, the Times New Roman logical fonts 281A and 281B in the OpenedDynamicLogicalFontList each have a set 285 of characters defined for them that is a combination of the sets 287 and 289 defined in PFRs 124E and 124F, respectively, shown in PFR cache 294 of FIG. 10.

After the Step 284 of FIG. 9 has installed the PFR just received into the PFR cache, Step 286 tests to see if, with the installation of this PFR, all of the PFRs and certificates referenced in the Web page are currently cached. If so, it calls renderPageWithPFRs.

If the current Web page contained any CERT tags, and Step 277 requested any certificate files identified in such tags, each time such a certificate file is received by the browser a corresponding message will be placed on the message queue. Soon thereafter Step 260 will obtain that message from the queue and Step 291 will cause Steps 308 through 319 to be performed.

Step 307 creates an entry for the certificate just received in the certificate cache 306 shown in FIG. 1. Step 308 saves the URL representing the address from which the certificate came in a field certifURL associated with its entry in the cache. Step 310 calculates an error correction code for the encrypted bytes 228 of the certificate, shown in FIG. 7, and checks to see if this code matches the error correction code 236 stored in the certificate for those same encrypted bytes. If the calculated and stored error correction codes do not match, it marks the certificate as invalid in the cache. If Step 310 finds the error correction codes do match, Step 312 causes Steps 314 through 319 to be performed.

Step 314 temporarily decrypts the encrypted bytes 228 of the certificate. Then Step 316 tests to see if the text of the decrypted URL 232 from within the certificate matches certifURL, the URL from which the certificate was obtained by the browser, minus the certificate's file name. If these URLs match, Steps 316 marks the certificate as valid. If not, Step 318 marks the certificate as invalid.

Regardless of whether or not Step 310 through 318 find the certificate just received to be valid, Step 319 tests to see if with it, all of the PFRs and certificates referenced in the current Web page have been received. If so it calls renderPageWithPFRs, to render the page with such PFRs.

FIG. 11 describes the renderPageWithPFRs routine 280, which displays the current Web page starting at some specified start point within its text using the PFRs referenced in the page. This routine performs a loop 292, comprised of Steps 294 through 302, for each continuous string of characters in the Web page's text which are to be rendered in a single logical font.

If the HTML text of the Web page indicates the current string of loop 292 is to be rendered in a font which is installed in the font manager 192 of the browser's computer, Step 294 calls the font manager to render the font. Otherwise Step 296 calls the CspDoString routine 301 which is part of the character shape player, or CSP, module 299, which contains the basic functions necessary to render font shapes from PFRs. The CspDoString routine is described below with regard to FIG. 13. It renders the string with font definitions contained in a PFR. If the call to CspDoString returns with an error message indicating it cannot render the string, Step 298 causes Steps 300 and 302 to be performed. Step 300 pops up an error box stating that the page attempted to render text with an unauthorized or unavailable font, and then Step 302 calls the operating system's font manager to render the text with a default font.

FIG. 13 is a highly simplified pseudo-code description of the CspDoString function 301 used with the embodiment of the invention shown in FIG. 1. This routine is called with multiple parameters, including docURL, the URL of the document being rendered; a list of all certificates, if any, identified in one or more CERT tags field in the document; the string to be rendered; its logical font; and the screen position at which the string is to be rendered.

After CspDoString is called, a Step 320 performs a loop comprised of Steps 322 through 344 for each character in the string with which CspDoString was called.

Step 322 clears a variable charsPFR associated with the individual character, which will be used to indicate which PFR, if any, can be used to render the character. Then Step 324 performs a loop for each successive PFR defining characters for the current font which is referenced in the document being rendered. The loop 324 is repeated until either the loop has been performed for all such PFRs or until charsPFR has a non-zero value, which ever comes first. Step 324 determines which PFRs have the current font by examining the Opened DynamicPhysicalFontList 288 shown in FIG. 11 to find pointers 283 to individual PFRs, such as 124D–F shown in FIG. 10, in the PFR cache 294 which contain characters in the current physical font. The loop 324 is comprised of Steps 326 through 340.

Step 326 tests if the current PFR for which loop 324 is being performed either has an empty authorization table 240, shown in FIG. 6, or has no character record 182 for the current character of loop 320. If the first of these conditions is met, the PFR is not authorized for use with any documents. If the second of these conditions is met, the PFR does not contain a description of the current character and, thus, cannot be used to render it. If either of these conditions is met Step 328 ends the loop of Step 324 for the current PFR.

If neither of these conditions are met, Step 330 performs a three part test comprised of tests 332 through 338. If any of these tests are true, Step 340 sets charsPFR to the current PFR of loop 324, indicating the PFR not only contains the shape of the current character, but also that it is authorized for use in rendering the current document.

The test 332 is itself a three part test to determine if the current PFR is authorized for use with the current document by a certificate residing in a directory indicated in the fully-authorized directory list box 200 of FIG. 7 when the PFR was made. First it tests to see if docURL, the text of the current document's URL, matches all or a part of any of certURL, the text of a certificate's URL in one of the current document's CERT tags, for any certificate identified by the current document. If so it performs a second test to determine if the matching certificate is marked as valid. If so it performs a third test of checking to see if the matching certificate's authorization key 234, once decrypted, matches one of the authorization keys 242 stored in the PFR's decrypted authorization key table.

The test 334 determines if the current PFR is authorized for use with the current document as a result of the document residing directly in a directory indicated in the individually-authorized directory list box 202 of FIG. 7 when the PFR was made. This test checks if the hash of the text of docURL, minus the document file name, matches any authorization key 242 stored in the current PFR's decrypted authorization key table.

The test 338 checks if the PFR contains a special redistribution key, not described above, which indicates the PFR is intended to be usable with any document files.

As stated above, if any of the three tests 332, 334, or 338 is met, Step 340 sets charsPFR for the current character of loop 320 to the current PFR of the loop 324 to indicate that the current PFR contains the current character's shape description and that it is authorized for use in rendering the current document.

If after the completion of loop 324 for a given character, the value of charsPFR for the character still has a zero value it indicates either that no PFR listed in the document's PFR tags contains the shape of the current character or that none of them which do contain the character's shape are authorized for use in rendering fonts for the current document. In either case, the PFR cannot be used to render the string and, thus, Step 344 returns to the program that called it with an error message. As described above, this will cause Step 298 of renderPageWithPFRs shown in FIG. 11, to cause a dialog box to be displayed indicating the problem and then to render the entire string with a default font.

If, on the other hand, loop 324 finds a PFR which can render each character in the loop 320, Step 320 will be completed, and the program will advance to a loop 346 which calls a Step 348 to use the PFR indicated in each character's charsPFR to render each character in the string with which CspDoString was called.

Once this has been done the entire string will have been rendered and Step 350 will return to the program which called CspDoString.

Figure 14:
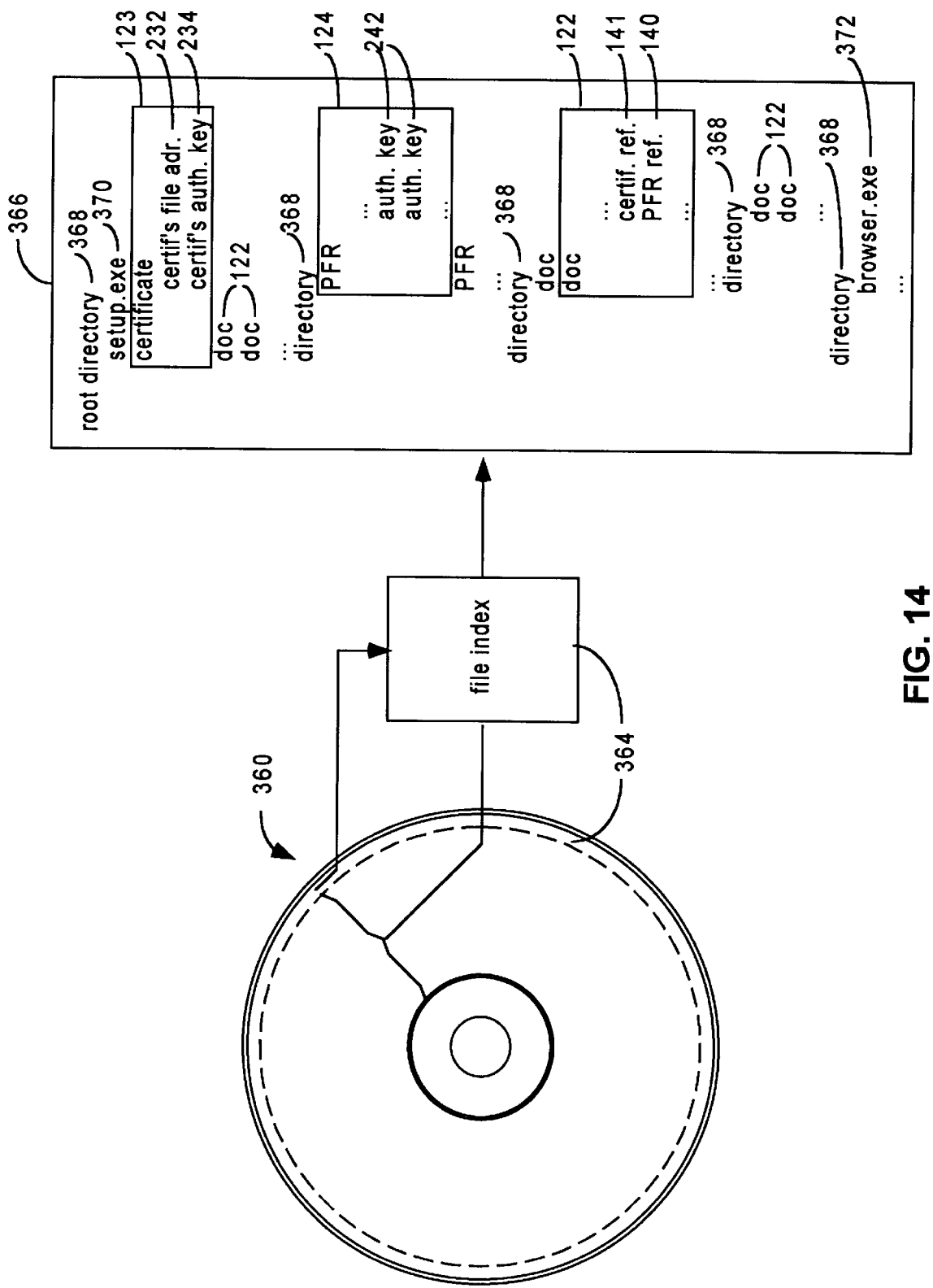
FIG. 14 is a highly simplified illustration of a hierarchical file address space—including documents with references to PFRs and certificates, PFRs with authorization keys, and certificates—which is recorded on a computer readable media such as a CD-ROM.

FIG. 14 illustrates a CD-ROM 360 which can be used as part of the present invention in computers which contain a ChDROM drive, such as the drive 362 shown in computer 104A in FIG. 1. The CD-ROM diskette 360 records a file index portion 364, shown in FIG. 1 at the outside edge of the diskette 360. This file index portion defines a hierarchical address space 366 of directories 368 and files which are recorded on the diskette 360 and maps that address space into physical locations on the diskette. The hierarchical address space 366 represented on the diskette has recorded in it HTML document files 122, similar to those describe above, which include PFR tags 140 and CERT tags 141. The diskette 360 records one or more certificate files 123, similar to those described above, each including the text 232 of the certificate file's URL, which is its files path name, minus its individual file name, and a certificate authorization key 234 which is a hash of the URL 232. The diskette 360 also has recorded on it one or more PFR files 124, similar to those discussed above, each of which includes one or more authorization keys 242. In addition, the diskette records a setup.exe file 370 which will install a browser program 372, such as the one shown in FIG. 9, onto the hard drive of the computer with which the diskette is used. This will enable a computer which did not previously have a web browser to navigate among, and render documents recorded on, the diskette in much the same manner as if the documents resided on an external computer on the Web.

FIGS. 14 and 15 relate to a change which can be made to the embodiment of the invention described above which allows the functional contents of a page imaging resource to be encrypted in a manner which makes those functional contents more difficult to access, except when they are used in the context of an authorized directory or set of directories.

FIG. 14 show a PFR 124" in which the main body 380 of that PFR, including the logical font directory 190", logical and physical font records 188" and 180", respectively, and the simple and compound glyph program strings 184" and 186", respectively, are all encrypted. This main body of the PFR is encrypted with a bodyEncryptionKey 382. A separate copy of this bodyEncryptionKey is stored in association with each authorization key represented by a separate entry 242" in the authorization key table 240". With this embodiment of the invention, the hashed byte patterns of the authorization keys derived for the URL of a certificate or an individually-authorized directory in Steps 222 or 246 of MakePfrsForFiles, shown in FIG. 5, are not directly stored in the authorization table 240". Instead, for each such given authorization key, a body of encrypted bytes 242" is stored which is derived from encrypting the concatenation of a standardPattern of bytes 384 and the bodyEncryptionKey 382 with the given authorization key. The authorization key is stored indirectly, that is, by the manner in which it encrypt the standardPattern 384.

FIG. 15 illustrates the matchAgainstPFRsAuthorizationKeys routine 390, which is called for matching the authorization keys of a PFR of the type shown in FIG. 15 against a certificate's authorization key or a hash of a docURL, respectively, in Steps 332 or 334 of CspDoString, shown in FIG. 13.

Step 392 of matchAgainstPFRsAuthorizationKeys uses the hashed value being matched against the PFR's authorization keys, either the certificate's authorization key or the hash of docURL, to attempt to decrypt a temporary copy of the PFR's entire authorization key table 240". If the hashed value being used for such decryption matches one of the authorization keys used to encrypt one of the entries 242" in the PFR's authorization key table, the resulting decryption of the table will produce the original standardPattern in that entry 242". If this happens, the test of Step 394 will be met and Steps 396 and 398 will be performed.

Step 396 tests if a flag is PFREncrypted 400, shown in FIG. 15, is still TRUE, meaning the body 380 of the PFR has not yet been decrypted. If so, Step 396 uses the copy of the properly decrypted bodyEncryptionKey which is next to the properly decrypted standardPattern to decrypt the body 380 of the PFR and then sets isPFREncrypted to FALSE, to indicate that the major portion of the PFR is no longer encrypted.

Step 398 then indicates that the hashed value, either the certificate's authorization key or the hashed docURL, matches one of the authorization keys of the PFR for purposes of the tests of Steps 332 or 334 of CspDoString, shown in FIG. 13. This means the PFR will be authorized for use with the current document.

Thus, it can be seen that the version of the invention described with regard to FIGS. 15 and 16 makes it difficult to gain useful access to the functional contents of a page imaging resource, such as the font descriptions of a PFR, unless they are used in an authorized context.

It should be understood that the foregoing description and drawings are given merely to explain and illustrate and that the invention is not limited thereto except insofar as the interpretation of the appended claims are so limited. Those skilled in the art who have the disclosure before them will be able to make modifications and variations therein without departing from the scope of the invention.

As those skilled in the computer arts will understand, many of the functions described above as being performed in software could be performed in hardware. Similarly, the particular division of functionality into specific routines, functions, and modules described above is highly arbitrary and the invention is not limited to such divisions.

The embodiments of the invention shown above are used with a World Wide Web browser for rendering documents received from the Internet or a CD-ROM. It should be understood, however, that the invention can be used with virtually any method of distributing software resources, such as by interactive TV, local or wide area networks, satellite broadcast, distribution on floppy disks, DVD, or any other medium for recording software resources.

Similarly, it should be understood that the invention is not limited to use with documents in the form of HTML pages. It could be used with screens from computer games, screens in interactive TV, presentation screens, email, or more traditional business or personal documents.

In the embodiments of the invention described above, the resources whose use is purposefully restricted are mainly portable font resources, some of which define the shape of non-text graphic images. It should be understood, however, that the invention can be used not only with other sorts of screen imaging resources, such as photographic images, or even video segments, but also with other types of software resources such as software applets. Similarly, the invention is not limited to use with documents, or text, but can be used with any distribution of multiple software resources which are intended for use together.

It should be appreciated that many different hashing and encryption schemes can be used with the present invention. For example, public-private key encryption could be used with the present invention, although doing so might slow down performance somewhat.

In the embodiments of the invention shown above, two basic types of authorization codes are used. Those represented in certificates of the type shown in FIG. 7, and those represented by the authorization key table of PFRs shown in FIGS. 6 and 15. It should be appreciated that other types of authorization codes could be used. For example, authorization key tables and their as associated error correction and change authorization codes shown in FIGS. 6 and 15 need not be part of PFRs, but could be in separate files. In such a system the separate authorization key table could have a key which made it impossible to use with any other PFR that the ones it was intended for. In other embodiments it would be possible for the authorization code in PFR's to identify the one or more documents the PFR is authorized for use with other than by means relating to the source address of such documents. For example, it would be possible for an authorization key in a PFR to be a hash of all or a part of the text or other attributes associated with a document file with which it is authorized for use. In yet, other embodiments of the invention the authorization code could be a code which is highly difficult to improperly forge that is placed in the document with which the PFR is intended for use and which identifies the PFR in an encrypted or hashed manner.

As these examples show, the invention has many possible embodiments, and its scope is not limited to the detailed description provided above, but rather is best defined by the claims that follow.

What we claim is:

1. A computer system comprising:
   means for receiving each of one or more software resources from a source address within an address space, including receiving in association with a given one of said resources an authorization code which represents one or more addresses within said address space;
   means for detecting the source address from which a given one of said resources is received; and
   means for controlling what, if any, use is made of the given received resource as a function of whether or not the detected source address matches one of said addresses represented by the authorization code.

2. A computer system as in claim 1 wherein:
   said authorization code includes a hash of each of the one or more addresses it represents; and
   said means for controlling compares a hash of said detected source address against the one or more hashed addresses included in said authorization code.

3. A computer system as in claim 1 wherein:
   said means for receiving resources includes means for receiving a document and one or more page imaging resources which contain information which can be used in rendering an image of a document;
   said resource whose source address is detected is a document;
   said authorization code is associated with a given page imaging resource; and
   said means for controlling includes means for determining whether or not a given page imaging resource can be used in rendering an image of the document as a function of whether or not the source address detected for the document matches one of the addresses represented by the authorization code associated with said given page imaging resource.

4. A computer system as in claim 3 wherein:
   said address space is hierarchical;
   said system includes means for detecting the source address from which said authorization codes is received;
   said given page imaging resource include an authorization code identifier which identifies one or more authorization codes; and
   said means for determining whether or not a given page imaging resource can be used to render a given document includes means for basing said determination upon:
      whether or not the given document's detected source address equals or is hierarchically under the detected source address of said authorization code; and
      whether or not the given page imaging resource's authorization code identifier identifies said authorization code.

5. A computer system as in claim 3 wherein:
   said means for receiving receives said authorization code as part of the page imaging resource with which it is associated; and
   said means for determining whether or not a given page imaging resource can be used to render a given document includes means for basing said determination on whether or not the detected source address of said given document matches one of the addresses represented in said authorization code.

6. A computer system as in claim 1 further including means for decrypting said authorization code before said means for controlling determines whether or not said detected source address matches one of said addresses represented by the authorization code.

7. A computer system as in claim 1 wherein:
   said system includes a mass storage medium including a hierarchical address space;
   said means for receiving includes means for receiving said resources from said mass storage medium; and
   said address space from which said source address is detected is said hierarchical address space of said mass storage medium.

8. A computer system as in claim 1 wherein:
   said means for receiving includes means for receiving said resources from a computer network which defines an address space of information resources which are available over said network; and
   said address space from which said source address is detected is said address space defined by said computer network.

9. A computer system comprising:
   means for receiving each of one or more software resources from a source address within an address space, including receiving in association with one of said resources an authorization code which represents one or more addresses within said address space;

means for detecting the source address from which a given one of said resources is received; and means for controlling what, if any, use is made of the given received resource as a function of whether or not the detected source address matches one of said addresses represented by the authorization code;

wherein:

said means for receiving includes means for receiving said resources from a computer network which defines an address space of information resources which are available over said network; and said address space from which said source address is detected is said address space defined by said computer network;

said means for receiving network resources includes:
  means for receiving a document as a first network resource, which document identifies the network address of a page imaging resource, which page imaging resource is a second network resource which can be used in rendering an image of said document and which contains said authorization code; and
  means, responsive to said network address identified in said document, for requesting and receiving said page imaging resource over the network;
  said means for detecting detects the source network address of said document; and said means for controlling controls whether or not the page imaging resource can be used in rendering an image of said document as a function of whether or not the detected network source address of the document matches one of the addresses represented in the authorization code contained in the page imaging resource.

10. A computerized method for rendering a document, said method comprising the steps of:
  receiving one or more documents each of which includes references to one or more page imaging resources which can be used in rendering an image of said document;
  receiving one or more of said page imaging resources, each of which contains information which can be used in rendering an image of one or more documents;
  receiving, in addition to said references to page imaging resources in said documents, an authorization code indicating with which of one or more documents a given page imaging resource has authorization to be used; and
  rendering a given document, including controlling what, if any, use is made of a given page imaging resource in rendering said given document as a function of what, if any, authorization said authorization code gives for the use of the given page imaging resource with the given document.

11. A computerized method for rendering a document, said method comprising the steps of:
  receiving one or more documents each of which includes references to one or more page imaging resources which can be used in rendering an image of said document;
  receiving one or more of said page imaging resources, each of which contains information which can be used in rendering an image of one or more documents;
  receiving, in addition to said references to pae imaging resources in said documents, an authorization code indicating with which of one or more documents a given page imaging resource has authorization to be used; and
  rendering a given document, including controlling what, if any, use is made of a given page imaging resource in rendering said given document as a function of what, if any, authorization said authorization code gives for the use of the given page imaging resource with the given document;

wherein:
  said document contains text including a succession of characters and indications of the fonts associated with different ones of those characters;
  said page imaging resource is a font resource, containing computer readable descriptions of character-font shape, each of which describes the shape of a given character in a given font; and
  said step of controlling what use is made of a given page imaging resource determines whether or not a given font resource can be used to render character font shapes identified in said document as a function of whether said authorization code authorizes use of the font resource with the document.

12. A computer readable media comprising:
  data recorded on said media representing one or more documents;
  data recorded on said media representing one or more page imaging resource which can be used in rendering the image of a document; and
  data recorded on said media representing an authorization code indicating what page imaging resource is authorized to be used to render the image of what document.

13. A computer readable media as in claim 12 wherein:
  said media includes data defining an address space, and defining an address within in said address space associated with each such document;
  said media stores each such document at one or more locations corresponding to said document's associated address; and
  said authorization code is stored in association with a given page imaging resource and stores a representation of one or more addresses, each of which is corresponds to the address associated with one or more of said documents for which said given page imaging resource is authorized to be used.

14. A computer readable media as in claim 12 further has recorded on it programming software for controlling whether or not a given page imaging resource is used in rendering the image of a given document as a function of whether or not the authorization code recorded on the media indicates it is authorized for such use with the given document.

15. A computer readable media as in claim 12 wherein:
  said documents and page imaging resources are each recorded as separate files on said media, and
  said individual authorization codes are recorded as part of page imaging resource files.

16. A computer system for making information available over a computer network comprising:
  means for storing:
    data representing one or more documents, each which contains information indicating one or more page imaging resources which can be used to render one or more specific portions of the image of said document; and data representing one or more page imaging resource, each of which can be used in rendering the image of one or more document; and data representing an authorization code indicating with what one or more documents a given page imaging resource is authorized to be used for the purpose of rendering the image of such documents; and means for making said documents, page imaging resources, and authorization codes available over said network in response to requests from other computers.

17. A computer system for making information available over a computer network comprising:

means for storing:

data representing one or more documents, each which contains information indicating one or more page imaging resources which can be used to render one or more specific portions of the image of said document; and data representing one or more page imaging resource, each of which can be used in rendering the image of one or more document; and data representing an authorization code indicating with what one or more documents a given page imaging resource is authorized to be used for the purpose of rendering the image of such documents; and means for making said documents, page imaging resources, and authorization codes available over said network in response to requests from other computers; wherein:

each of said documents includes a network address for a page imaging resource which can be used to render the document's image;

each of a plurality of said page imaging resources includes one of said authorization codes indicating which one or more documents it is authorized for use with; and said means for making said documents, page imaging resources, and authorization codes available over the network includes means for responding to a request from a remote network entity for a document which request gives the network address of both the document and the requesting entity by sending the document over the network to the requesting entity; and means for responding to a request from a remote network entity for a page imaging resource which request gives the network address of both the page imaging resource and the requesting entity by sending the page imaging resource and the authorization code it contains over the network to the requesting entity.

18. A computerized system for authoring documents comprising:

means for enable a user to selectively create and record on computer readable media one or more documents;

means for placing in individual such documents an indication of one or more page imaging resources which can be used in rendering the image of said document;

means for enabling a user to selectively specify with which of one or more documents a given page imaging resource is authorized for use; and means for creating and recording on computer readable media one or more of said page imaging resources containing information for use in rendering the image of one or more documents and for creating and recording on said media in association with a given page imaging resource an authorization code indicating with what one or more documents said user has indicated said given page imaging resources is authorized for use.

19. A computerized method comprising:

receiving each of one or more software resources from a source address within an address space, including receiving in association with a given one of said resources an authorization code which represents one or more addresses within said address space;

detecting the source address from which a given one of said resources is received; and controlling what, if any, use is made of the given received resource as a function of whether or not the detected source address matches one of said addresses represented by the authorization code.

20. A computerized method as in claim 19 wherein:

said authorization code includes a hash of each of the one or more addresses it represents; and said controlling of what use is made of the given received resource compares a hash of said detected source address against the one or more hashed addresses included in said autorization code.

21. A computerized method as in claim 19 wherein:

said receiving of resources includes receiving a document and one or more page imaging resources which contain information which can be used in rendering an image of a document;

said resource whose source address is detected is a document;

said authorization code is associated with a given page imaging resource; and said controlling of what use is made of the given received resource includes determining whether or not a given page imaging resource can be used in rendering an image of the document as a function of whether or not the source address detected for the document matches one of the addresses represented by the authorization code associated with said given page imaging resource.

22. A computerized method as in claim 21 wherein:

said address space is hierarchical;

said method includes detecting the source address from which said authorization codes is received;

said given page imaging resource include an authorization code identifier which identifies one or more authorization codes; and said determining whether or not a given page imaging resource can be used to render a given document includes basing said determination upon:

whether or not the given document's detected source address equals or is hierarchically under the detected source address of said authorization code; and whether or not the given page imaging resource's authorization code identifier identifies said authorization code.

23. A computerized method as in claim 21 wherein:

said receiving receives said authorization code as part of the page imaging resource with which it is associated; and said determining whether or not a given page imaging resource can be used to render a given document includes basing said determination on whether or not the detected source address of said given document matches one of the addresses represented in said authorization code.

24. A computerized method as in claim 19 further including decrypting said authorization code before said controlling of what use is made of the given received resource determines whether or not said detected source address matches one of said addresses represented by the authorization code.

25. A computerized method as in claim 19 wherein:
said method is practiced on a computer system that includes a mass storage apparatus capable of reading a mass storage medium including a hierarchical address space;
said receiving of software resources receives said resources by using said mass storage apparatus to read them from a mass storage medium; and
said address space from which said source address is detected is said hierarchical address space of said mass storage medium.

26. A computerized method as in claim 19 wherein:
said receiving of software resources includes receiving said resources from a computer network which defines an address space of information resources which are available over said network; and
said address space from which said source address is detected is said address space defined by said computer network.

27. A computerized method as in claim 26 wherein:
said receiving of network resources includes:
receiving a document as a first network resource, which document identifies the network address of a page imaging resource, which page imaging resource is a second network resource which can be used in rendering an image of said document and which contains said authorization code; and
requesting and receiving said page imaging resource over the network in response to said network address identified in said document;
said detecting of the source address detects the source network address of said document; and
said controlling of what use is made of the given received resource controls whether or not the page imaging resource can be used in rendering an image of said document as a function of whether or not the detected network source address of the document matches one of the addresses represented in the authorization code contained in the page imaging resource.

28. A computerized method for making information available over a computer network comprising:
storing:
data representing one or more documents, each which contains information indicating one or more page imaging resources which can be used to render one or more specific portions of the image of said document; and
data representing one or more page imaging resource, each of which can be used in rendering the image of one or more document; and
data representing an authorization code indicating with what one or more documents a given page imaging resource is authorized to be used for the purpose of rendering the image of such documents; and
making said documents, page imaging resources, and authorization codes available over said network in response to requests from other computers.

29. A computer system as in claim 28 wherein:
each of said documents includes a network address for a page imaging resource which can be used to render the document's image;
each of a plurality of said page imaging resource includes one of said authorization codes indicating which one or more documents it is authorized for use with; and
said making of documents, page imaging resources, and authorization codes available over the network includes
responding to a request from a remote network entity for a document which request gives the network address of both the document and the requesting entity by sending the document over the network to the requesting entity; and
responding to a request from a remote network entity for a page imaging resource which request gives the network address of both the page imaging resource and the requesting entity by sending the page imaging resource and the authorization code it contains over the network to the requesting entity.

30. A computerized method for authoring documents comprising:
enabling a user to selectively create and record on computer readable media one or more documents;
placing in individual such documents an indication of one or more page imaging resources which can be used in rendering the image of said document;
enabling a user to selectively specify with which of one or more documents a given page imaging resource is authorized for use; and
creating and recording on computer readable media one or more of said page imaging resources containing information for use in rendering the image of one or more documents and for creating and recording on said media in association with a given page imaging resource an authorization code indicating with what one or more documents said user has indicated said given page imaging resources is authorized for use.

31. Computer programming recorded in a machine readable memory comprising:
instructions for receiving each of one or more software resources from a source address within an address space, including receiving in association with a given one of said resources an authorization code which requests one or more addresses within said address space;
instructions for detecting the source address from which a given one of said resources is received; and
instructions for controlling what, if any, use is made of the given received resource as a function of whether or not the detected source address matches one of said addresses represented by the authorization code.

32. Computer programming as in claim 31 wherein:
said authorization code includes a hash of each of the one or more addresses it represents; and
said instructions for controlling compares a hash of said detected source address against the one or more hashed addresses included in said authorization code.

33. Computer programming as in claim 31 wherein:
said instructions for receiving resources include instructions for receiving a document and one or more page imaging resources which contain information which can be used in rendering an image of a document;
said resource whose source address is detected is a document;
said authorization code is associated with a given page imaging resource; and said instructions for controlling include instructions for determining whether or not a given page imaging resource can be used in rendering an image of the document as a function of whether or not the source address detected for the document matches one of the addresses representedby the authorization code associated with said given page imaging resource.

34. Computer programming as in claim 33 wherein:

said address space is hierarchical;

said programming includes instructions for detecting the source address from which said authorization codes is received;

said given page imaging resource include an authorization code identifier which identifies one or more authorization codes; and said instructions for determining whether or not a given page image resource can be used to render a given document include instructions for basing said determination upon:
   whether or not the given document's detected source address equals or is hierarchically under the detected source address of said authorization code; and
   whether or not the given page imaging resource's authorization code identifier identifies said authorization code.

35. Computer programming as in claim 33 wherein:

said instructions for receiving receives said authorization code as part of the page imaging resource with which it is associated; and said instructions for determining whether or not a given page imaging resource can be used to render a given document include instructions for basing said determination on whether or not the detected source address of said given document matches one of the addresses represented in said authorization code.

36. Computer programming as in claim 31 further including instructions for decrypting said authorization code before said instructions for controlling determine whether or not said detected source address matches one of said addresses represented by the authorization code.

37. Computer programming as in claim 36 wherein:

said programming includes instructions for reading from a mass storage medium including a hierarchical address space;

said instructions for receiving include instructions for reading said resources from said mass storage medium; and said address space from which said source address is detected is said hierarchical address space of said mass storage medium.

38. Computer programming as in claim 31 wherein:

said instructions for receiving include instructions for receiving said resources from a computer network which defines an address space of information resources which are available over said network; and said address space from which said source address is detected is said address space defined by said computer network.

39. Computer programming as in claim 38 wherein:

said instructions for receiving network resources include:
   instructions for receiving a document as a first network resource, which document identifies the network address of a page imaging resource, which page imaging resource is a second network resource which can be used in rendering an image of said document and which contains said authorization code; and
   instruction, responsive to said network address identified in said document, for requesting and receiving said page imaging resource over the network;
   said instructions for detecting detects the source network address of said document; and
said instructions for controlling controls whether or not the page imaging resource can be used in rendering an image of said document as a function of whether or not the detected network source address of the document matches one of the addresses represented in the authorization code contained in the page imaging resource.

* * * * *